United States Patent
Takeshita et al.

(10) Patent No.: US 11,336,520 B2
(45) Date of Patent: May 17, 2022

(54) NETWORK DESIGN DEVICE, NETWORK DESIGN METHOD, AND NETWORK DESIGN PROCESSING PROGRAM

(71) Applicant: NIPPON TELEGRAPH AND TELEPHONE CORPORATION, Tokyo (JP)

(72) Inventors: Erina Takeshita, Musashino (JP); Hideo Kawata, Musashino (JP); Shinichi Yoshihara, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/978,011

(22) PCT Filed: Feb. 28, 2019

(86) PCT No.: PCT/JP2019/007805
§ 371 (c)(1),
(2) Date: Sep. 3, 2020

(87) PCT Pub. No.: WO2019/172071
PCT Pub. Date: Sep. 12, 2019

(65) Prior Publication Data
US 2021/0075676 A1    Mar. 11, 2021

(30) Foreign Application Priority Data

Mar. 7, 2018    (JP) .............................. JP2018-041278

(51) Int. Cl.
*H04L 41/0826* (2022.01)
*H04L 41/12* (2022.01)
(Continued)

(52) U.S. Cl.
CPC .......... *H04L 41/0826* (2013.01); *H04L 41/12* (2013.01); *H04L 41/145* (2013.01); *H04L 45/12* (2013.01)

(58) Field of Classification Search
CPC ... H04L 41/0826; H04L 41/145; H04L 41/12; H04L 45/12
See application file for complete search history.

(56) References Cited

U.S. PATENT DOCUMENTS

| | | | |
|---|---|---|---|
| 6,909,700 B1 * | 6/2005 | Benmohamed | H04L 41/145 370/255 |
| 2007/0053342 A1 * | 3/2007 | Sierecki | H04L 45/10 370/351 |

(Continued)

OTHER PUBLICATIONS

Erina Takeshita, Hideo Kawata. "Proposal of network design method to accommodate various paths." B-6-29, IEICE General Conference 2017. Mar. 20, 2017.

*Primary Examiner* — John A Follansbee
*Assistant Examiner* — Fadi Haj Said

(57) ABSTRACT

With a network design apparatus, a network design method, and a network design processing program, a network configuration is designed for a network in which a transfer apparatus is disposed at each of a plurality of communication hubs and the communication hubs are connected via a link by a link portion apparatus in the transfer apparatus. In design of a network configuration, an optimal combination candidate of a link portion apparatus for each link for minimizing a total cost value in an overall network is calculated on the basis of a combination candidate set of link portion apparatuses. The combination candidate set of the link portion apparatuses is configured using only combination candidates with a cost-effectiveness indicating a ratio of a total capacity to a total cost value of the link portion apparatus higher than a predetermined reference.

3 Claims, 7 Drawing Sheets

(51) Int. Cl.
    *H04L 41/14*    (2022.01)
    *H04L 45/12*    (2022.01)

(56) References Cited

U.S. PATENT DOCUMENTS

| | | | |
|---|---|---|---|
| 2012/0213081 A1* | 8/2012 | Imai | H04L 41/0806 |
| | | | 370/238 |
| 2015/0023666 A1* | 1/2015 | Hashiguchi | H04L 41/145 |
| | | | 398/79 |
| 2015/0085698 A1* | 3/2015 | Sella | H04L 45/44 |
| | | | 370/254 |
| 2017/0047999 A1* | 2/2017 | Wei | H04L 41/12 |
| 2020/0186459 A1* | 6/2020 | Fiaschi | H04L 45/123 |

* cited by examiner

NETWORK DESIGN DEVICE, NETWORK DESIGN METHOD, AND NETWORK DESIGN PROCESSING PROGRAM

CROSS-REFERENCE TO RELATED APPLICATIONS

This application is a 371 U.S. National Phase of International Application No. PCT/JP2019/007805, filed on Feb. 28, 2019, which claims priority to Japanese Application No. 2018-041278 filed on Mar. 7, 2018. The entire disclosures of the above applications are incorporated herein by reference.

TECHNICAL FIELD

Embodiments of the present invention relate to a network design apparatus, a network design method, and a network design processing program.

BACKGROUND ART

In recent years, with the diversification of network services, the number of services has increased and requirements of a network for the services have diversified. Examples of the requirements for a network include an inter-end delay, band assurance, and conditions regarding redundancy. With the increase in the number of services or the diversification of the requirements, the cost of equipment of the network has increased.

In order to curb the increase in cost, for example, a network design in which a plurality of lines possessed by each network service are efficiently accommodated in a common infrastructure network is performed in NPL 1. Accordingly, economy of the network is further improved. In a method of NPL 1, an infrastructure network accommodating lines having different requirements for an inter-end delay is designed. Here, in the infrastructure network to be designed, a transfer apparatus that processes traffic of a path is disposed, and an interface is installed as a link portion apparatus in a link portion of the transfer apparatus. In NPL 1, a disposition and capacity of transfer apparatuses for which a total cost value of interfaces of all transfer apparatuses on the infrastructure network is minimized are derived in the design of the infrastructure network. Thus, in the design of the infrastructure network, a design of a path accommodating each line and equipment design for designing the disposition or capacity of the transfer apparatus on the infrastructure network are performed simultaneously.

An overall flow in a process performed in NPL 1 is illustrated in FIG. 1. In a design of a network as in NPL 1, each line needs to be accommodated in a path satisfying requirements for an inter-end delay. Thus, in S'1, path candidates satisfying the requirements for the inter-end delay are calculated for each line, and a set of path candidates satisfying the requirements described above is a path candidate set, as illustrated in FIG. 1. The path candidate set consists of path candidates satisfying the requirements described above, and consists of the number of path candidates equal to or smaller than a designated number of path candidates. Here, the number of path candidates is a design parameter, and is designated by a designer.

Further, in NPL 1, interface combination candidates are calculated, and the calculated combination candidate set is used as an interface combination candidate set in S'2. In this case, combination candidates of interfaces that can be installed in the link portion of the transfer apparatus at each communication hub on the infrastructure network are calculated. The combination candidate set includes a number of combination candidates of interfaces that can be installed in the link portion as many as the designated number of interface combination candidates. Here, the number of combination candidates is a design parameter and is designated by a designer. Further, each of the interface combination candidates is a combination of zero or more interfaces. Further, certain interface combination candidates among the interface combination candidates may include the same type of interfaces.

In NPL 1, a total cost value of all the interfaces on the infrastructure network is used as an objective function, and an optimization problem in which an optimal network configuration for minimizing the objective function is derived is solved in S'3. A mathematical relationship obtained by formulating this optimization problem is shown below.

[Math. 1]

$$\underset{\vec{x},\vec{y}}{\operatorname{argmin}} 2\sum_{e\in E}\sum_{j\in J} y_j^e \cdot \Omega_j^{IF} \quad (1)$$

subject to, $$\sum_{i\in I^v} x_i^v = 1, \quad \forall v \in V \quad (2)$$

$$\sum_{j\in J} y_j^e = 1, \quad \forall e \in E \quad (3)$$

$$y_j^e \cdot \Psi_j^{IF} \geq t^e(\vec{x},\vec{d},M) \quad \forall e \in E \quad (4)$$

Further, matters indicated by, for example, parameters relevant to the relationships (1) to (4) are as follows.

[Math. 2]
L=(l): Set of communication hubs
E=(e): Set of links between Communication hubs
V=(v): Set of lines
$\vec{x}=(x_i^v)$: Line v selects path candidate i
$\vec{y}=(y_j^e)$: Link e selects interface (IF) combination j
$\Omega_j^{IF}$: Cost value of IF combination candidate j
$I^v$: Path candidate set of line v
J: IF Combination candidate set
$\Psi_j^{IF}$: Capacity of IF combination candidate j
$\vec{d}=(d_v)$: Contracted band of line v
M: Connection matrix (indicated by |L|×|E|) indicating connection form between communication hubs
$t^e(\vec{x},\vec{d},M)$: Sum of contracted bands of link e (calculated on basis of $\vec{x}$, $\vec{d}$M)

In the optimization problem of S'3, one path candidate is selected from the path candidate set for each line. For each line, a condition for selecting the path candidate from the path candidate set is shown in the relationship (2). Here, in the relationships (1) to (4), a variable x is a decision variable of the optimization problem. In each line, the variable x changes in correspondence to which path candidate has been selected from the path candidate set. Further, in the optimization problem, one combination candidate for a combination of interfaces is selected from the interface combination candidate set, for each link portion of the transfer apparatus, that is, for each link connecting each communication hub. For each link portion, a condition for selecting an interface combination candidate from a combination candidate set is shown in the relationship (3). Here, in the relationships (1) to (4), a variable y is a decision variable of the optimization problem. In each link portion, the variable y changes in correspondence to which interface combination candidate has been selected from the combination candidate set.

Further, in the optimization problem of S'3, capacity conditions of the relationship (4) are provided. That is, in each link (each link portion), a total contracted band being equal to or smaller than a total capacity of all interfaces constituting the combination candidates is provided as the capacity conditions. Thus, in the optimization problem, a combination candidate selected from an interface combination candidate set needs to satisfy the capacity conditions described above in each link.

In S'3, a total cost value of all interfaces on an infrastructure network shown in the relationship (1) is used as an objective function, and an optimization problem for minimizing the objective function is solved. By solving the optimization problem, an optimal path candidate is determined from the path candidates satisfying the conditions of the relationships (2) to (4), and an optimal combination candidate is determined from the interface combination candidates satisfying the conditions of the relationships (2) to (4).

In NPL 1, because the process is performed as described above, a network configuration with a smallest total cost value, that is, an optimal network configuration can be derived in an infrastructure network accommodating lines having different requirements for an inter-end delay. That is, for a network configuration including a path accommodating lines, and a disposition and capacity of each of transfer apparatuses and link portion apparatuses, an optimal network configuration can be derived from among a plurality of patterns.

CITATION LIST

Non Patent Literature

NPL 1: Erina Takeshita and Hideo Kawada, "Proposed Network Design Scheme Accommodating Various Paths", Electronics, Information and Communication Engineers General Conference B-6-29, 2017.

SUMMARY OF THE INVENTION

Technical Problem

In NPL 1, combination candidates are calculated in ascending order of the total capacity of the interfaces constituting the combination candidate in the calculation of the interface combination candidate of S'2. In the calculated combination candidate set, the total capacity of the interfaces is different for each combination candidate. Since the combination candidate set is calculated as described above, combination candidates that are cost-effective are included in the combination candidate set. Here, in each combination candidate, the cost-effectiveness indicates a ratio of the total capacity of the interfaces to a total cost of the interfaces. In the combination candidates that are cost-effective, the total capacity of the interfaces is smaller, but the total cost value of the interfaces constituting the combination candidate is greater than in other combination candidates. By the combination candidates that are cost-effective being included in the combination candidate set as described above, a pattern of a network configuration that is cost-effective is taken into account as an option in the calculation of the optimization problem for S'3. Thus, the derivation of the optimal network configuration is not performed efficiently.

The present invention has been made in view of the above circumstance, and provides a network design apparatus, a network design method, and a network design processing program capable of efficiently designing an optimal network configuration without taking a pattern of a network configuration with low cost efficiency into account in the calculation of an optimization problem.

Means for Solving the Problem

To achieve the above object, a first aspect of the invention is a network design apparatus for designing a network configuration for a network in which a transfer apparatus is disposed at each of a plurality of communication hubs and the communication hubs are connected via a link by a link portion apparatus in the transfer apparatus, the network design apparatus including: an input reception unit configured to receive an input of topology information on a connection state between the communication hubs, line information regarding a plurality of lines accommodated in the network, apparatus information regarding the transfer apparatus disposed at the communication hub and the link portion apparatus in the transfer apparatus, and design parameter information regarding parameters used in the design; a first processing unit including a calculation unit configured to calculate a path candidate set for each line on the basis of the topology information, the line information, and the design parameter information; a second processing unit including a calculation unit configured to calculate a combination candidate set of the link portion apparatuses on the basis of the apparatus information and the design parameter information, the calculation unit configuring the combination candidate set of the link portion apparatuses using only combination candidates of the link portion apparatuses with a cost-effectiveness indicating a ratio of a total capacity of the link portion apparatus to a total cost value of the link portion apparatus higher than a predetermined reference; a third processing unit including a calculation unit configured to calculate an optimal path candidate of each line and an optimal combination candidate of the link portion apparatus of each link for minimizing a total cost value in the overall network on the basis of a calculation result of the calculation unit of the first processing unit and a calculation result of the calculation unit of the second processing unit; and a generation unit configured to generate network configuration information reflecting both the optimal path candidate of each line and the optimal combination candidate of the link portion apparatus of each link calculated by the calculation unit of the third processing unit.

A second aspect of the present invention is the network design apparatus according to the first aspect, wherein the calculation unit of the second processing unit calculates the combination candidate set on condition that both the total capacity of the link portion apparatus and the total cost value of the link portion apparatus are different for each combination candidate in the combination candidate set of the link portion apparatus, and that each combination candidate in the combination candidate set of the link portion apparatus has a larger total capacity of the link portion apparatus than other combinations of the link portion apparatuses having the same total cost value as that of the combination candidate and not included in the combination candidate set.

A third aspect of the present invention is the network design apparatus according to the second aspect, wherein, the calculating of the combination candidate set includes, at the calculation unit of the second processing unit, adding a new combination of the link portion apparatuses to the combination candidate set as the combination candidate in ascending order of the total capacity of the link portion apparatus, and deleting, in response to the addition of the new combination to the combination candidate set, a combination candidate in which the total cost value of the link portion apparatus is equal to or greater than the total cost value of the link portion apparatus in the added new combination, from among the combination candidates already included in the combination candidate set of the link portion apparatuses.

A fourth aspect of the present invention is a network design processing program for causing a processor to function as each unit of the network design apparatus according to any one of the first to third aspects.

A fifth aspect of the present invention is a network design method for designing a network configuration for a network in which a transfer apparatus is disposed at each of a plurality of communication hubs and the communication hubs are connected via a link by a link portion apparatus in the transfer apparatus, the network design method comprising: acquiring topology information on a connection state between the communication hubs, line information regarding a plurality of lines accommodated in the network, apparatus information regarding the transfer apparatus disposed at the communication hub and the link portion apparatus in the transfer apparatus, and design parameter information regarding parameters used in the design; calculating a path candidate set for each line on the basis of the topology information, the line information, and the design parameter information; calculating a combination candidate set of the link portion apparatuses on the basis of the apparatus information and the design parameter information, and configuring the combination candidate set of the link portion apparatuses using only combination candidates of the link portion apparatuses with a cost-effectiveness indicating a ratio of a total capacity of the link portion apparatus to a total cost value of the link portion apparatus higher than a predetermined reference; calculating an optimal path candidate of each line and an optimal combination candidate of the link portion apparatus of each link for minimizing a total cost value in the overall network on the basis of a calculation result for the path candidate set for each line and a calculation result for the combination candidate set of the link portion apparatuses; and outputting network configuration information reflecting both the calculated optimal path candidate for each line and the calculated optimal combination candidate of the link portion apparatus for each link.

Effects of the Invention

According to the first to fifth aspects of the present invention, the combination candidate set of the link portion apparatuses is configured using only the combination candidates of link portion apparatuses with a cost-effectiveness indicating a ratio of a total capacity of the link portion apparatus to a total cost value of the link portion apparatus higher than a predetermined reference. An optimal path candidate for each line and an optimal combination candidate of the link portion apparatus for each link for minimizing the total cost value in the overall network are calculated on the basis of the combination candidates of the link portion apparatuses configured using only the combination candidates with a higher cost-effectiveness than the predetermined reference. Thus, in optimization calculation for determining the optimal interface combination candidate, combination candidates with low cost efficiency are excluded from options. Thereby, in the calculation of the optimization problem, it is possible to efficiently derive the optimal path candidate and the optimal interface combination candidate without taking the pattern of the network configuration with low cost efficiency into account.

Accordingly, according to the first to fifth aspects of the present invention, it is possible to efficiently design the optimal network configuration without taking the pattern of the network configuration with low cost efficiency into account in the calculation of the optimization problem.

Further, in the second and third aspects of the present invention, each of the combination candidates included in the combination candidate set satisfies the above-described conditions regarding the total capacity of the interfaces and the total cost value of the interfaces. Thus, only the interface combination candidates with high cost efficiency are appropriately included in the combination candidate set.

Further, in the third aspect of the present invention, a new combination of the link portion apparatus is added to the combination candidate set as a combination candidate in ascending order of the total capacity of the link portion apparatus in the calculation of the combination candidate set. A combination candidate in which the total cost value of the link portion apparatus is equal to or greater than the total cost value of the link portion apparatus in the new combination to be added is deleted from among the combination candidates already included in the combination candidate set of the link portion apparatus in response to the addition of the new combination to the combination candidate set. Thereby, the interface combination candidate set is appropriately configured using only combination candidates with high cost efficiency.

DESCRIPTION OF EMBODIMENTS

Hereinafter, embodiments of the present invention will be described with reference to the drawings. An L2 switch is used as an example of a network apparatus in each embodiment. As a transfer apparatus, any network apparatus can be used as long as the network apparatus is an apparatus in which a link portion apparatus such as an interface can be installed as equipment within the network apparatus, in addition to the L2 switch. For example, in each embodiment, a router or the like is available as the network apparatus (transfer apparatus).

First Embodiment

In a first embodiment, the interface combination candidate set can be configured using only combination candidates with a cost-effectiveness higher than a predetermined reference. This allows an optimal solution to be efficiently searched for in the optimization calculations.

Apparatus

Figure 1:
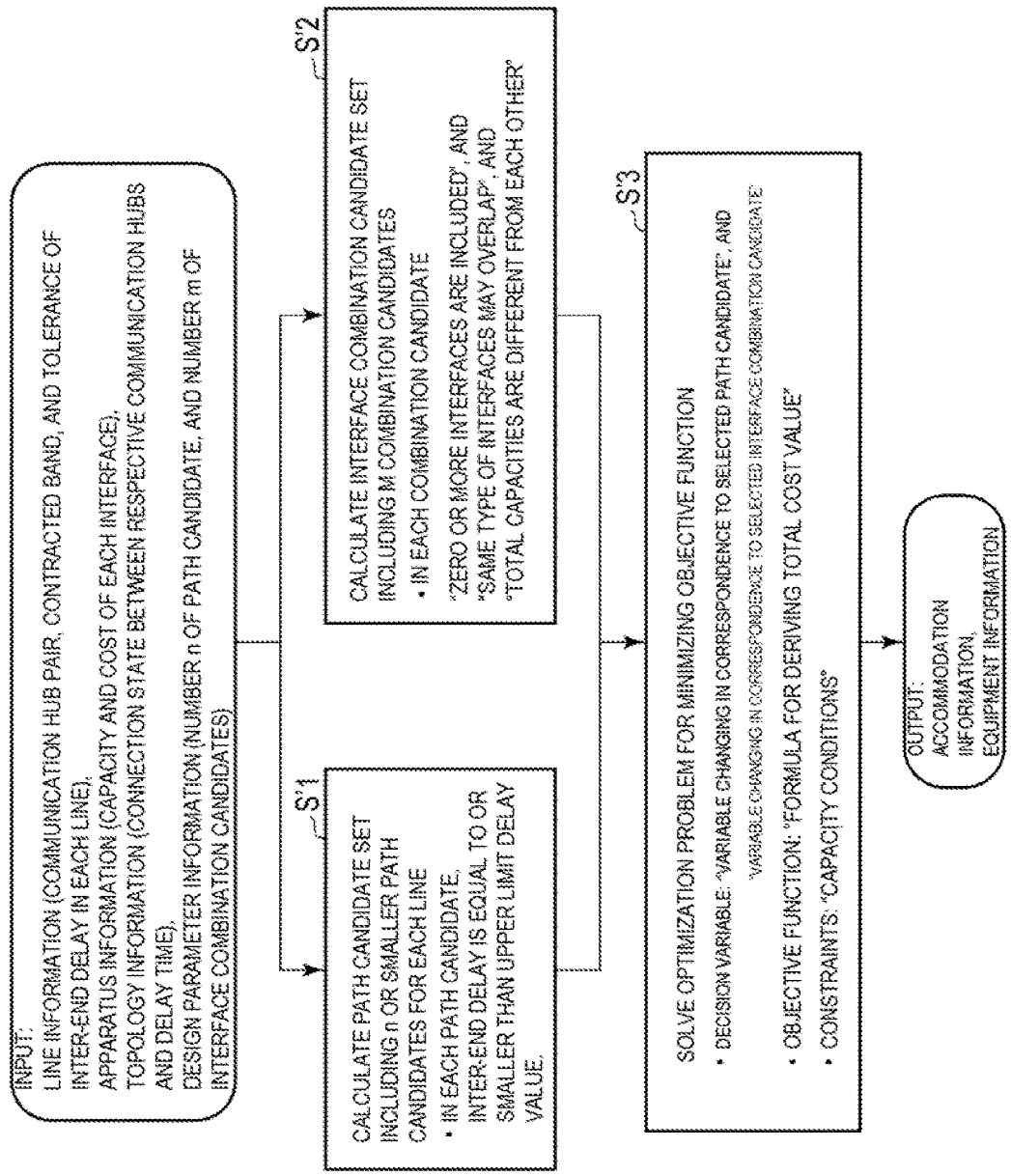
FIG. 1 is a flowchart illustrating an overall flow in a process performed in NPL 1.
Figure 2:
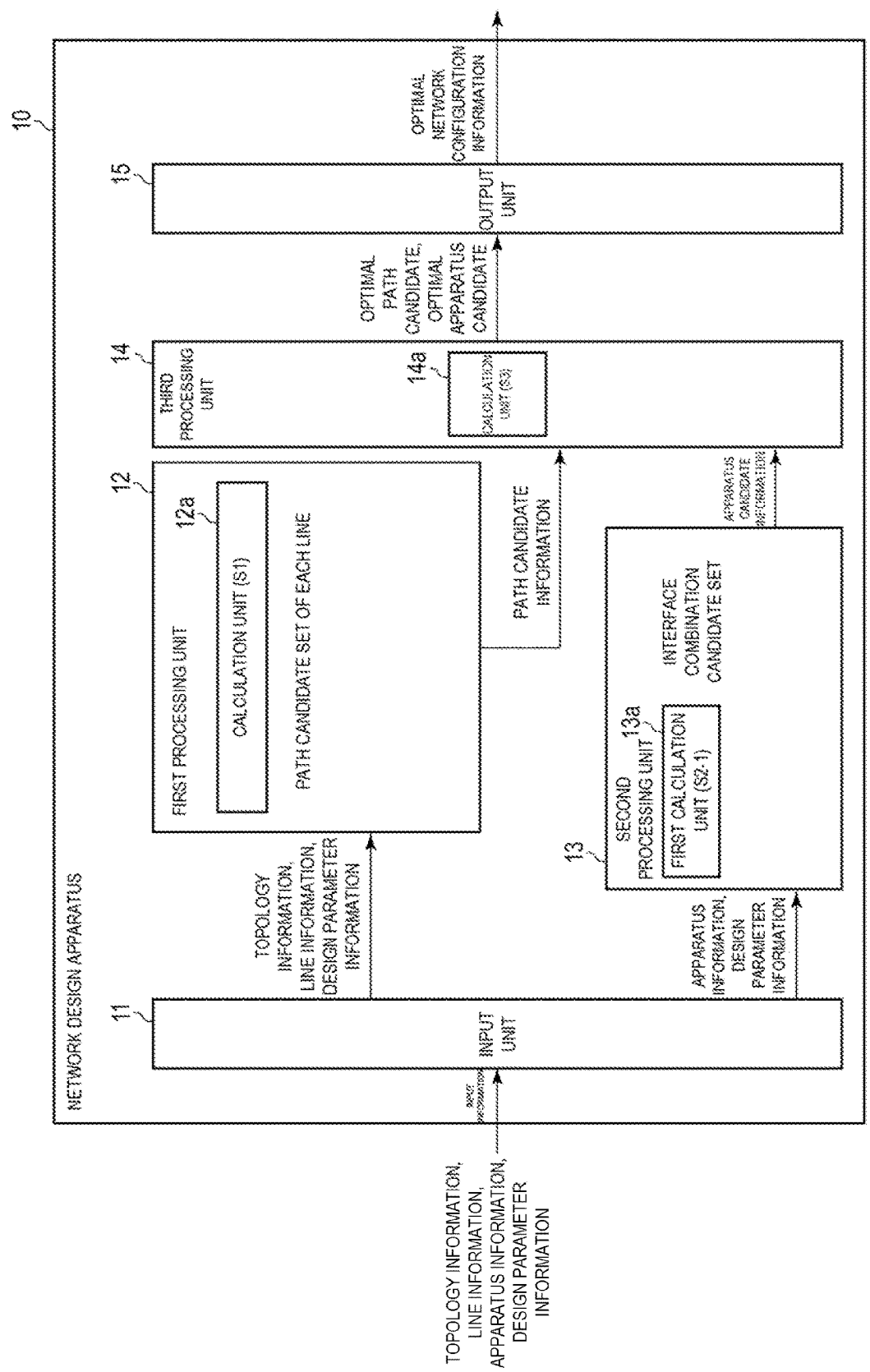
FIG. 2 is a block diagram illustrating an example of a network design apparatus according to a first embodiment of the present invention.

An example of a network design apparatus of the first embodiment is shown. FIG. 2 is a diagram illustrating an example of the network design apparatus according to the first embodiment of the present invention. The network design apparatus 10 outputs optimal network configuration information including optimal path information and optimal equipment information on the basis of input information. The network design apparatus 10 includes an input unit (input reception unit) 11, a first processing unit 12, a second processing unit 13, a third processing unit 14, and an output unit (generation unit) 15.

The first processing unit 12 includes a calculation unit 12a. The second processing unit 13 includes a calculation unit 13a. The third processing unit 14 includes a calculation unit 14a.

An input unit 11, which is an input reception unit, has a function of receiving input information input by a network designer, and outputting the input information to the first processing unit 12 and the second processing unit 13. The input information includes topology information, line information, apparatus information, and design parameter information. The topology information is information on a connection state between communication hubs on the infrastructure network. The line information is information on a plurality of lines accommodated in a network, and the plurality of lines are possessed by each network service. The apparatus information is information on a transfer apparatus disposed at each communication hub on the infrastructure network. Further, the apparatus information also includes information on a link portion apparatus such as an interface, which is installed on each transfer apparatus. The design parameter information is information on parameters that are used in design of a network.

The information including the topology information, the line information, and the design parameter information is input from the input unit 11 to the calculation unit 12a. The calculation unit 12a calculates a path candidate set from the information input from the input unit 11. The calculation unit 12a calculates the path candidate set of each line. The first processing unit 12 outputs the path candidate information including the path candidate set obtained by the calculation unit 12a. The path candidate information is output to the third processing unit 14.

Information including the apparatus information and the design parameter information is input from the input unit 11 to the calculation unit 13a. The calculation unit 13a calculates an interface combination candidate set from the information input from the input unit 11. The second processing unit 13 outputs apparatus candidate information including the interface combination candidate set obtained by the calculation unit 13a. The apparatus candidate information is output to the third processing unit 14.

The path candidate information is input from the first processing unit 12 to the calculation unit 14a, and the apparatus candidate information is input from the second processing unit 13 to the calculation unit 14a. The calculation unit 14a calculates an optimal path candidate and an optimal interface combination candidate from the path candidate information and the apparatus candidate information to be input. The third processing unit 14 outputs the optimal path candidate obtained by the calculation unit 14a to the output unit 15. Further, the third processing unit 14 outputs an optimal apparatus candidate including the optimal interface combination candidate derived by the calculation unit 14a to the output unit 15.

The optimal path candidate is input from the third processing unit 14 to the output unit 15, which is a generation unit. Further, the optimal apparatus candidate including the optimal interface combination candidate is input from the third processing unit 14 to the output unit 15. The output unit 15 generates network configuration information reflecting both the optimal path candidate and the optimal interface combination candidate on the basis of the information input from the third processing unit 14. The output unit outputs the network configuration information reflecting the optimal path candidate and the optimal interface combination candidate, as optimal network configuration information, to a terminal apparatus to be operated by the network designer. The optimal network configuration information includes information on an optimal path accommodating each line and optimal equipment information regarding a switch and an interface disposed at each communication hub. The optimal equipment information includes information on optimal disposition of switches and interfaces and an optimal capacity of the switches and the interfaces. The output unit (generation unit) 15 may store the generated optimal network information in a recording medium or the like instead of outputting the generated optimal network information to the terminal apparatus or the like.

Input Information

In the first embodiment, an example of the input information input to the input unit 11 of the network design apparatus 10 is shown. The input information is information input to the input unit 11 by a network designer. The input information that the network designer inputs to the input unit 11 of the network design apparatus 10 includes: (1) the topology information; (2) the line information; (3) the apparatus information; and (4) the design parameter information.

(1) The topology information includes (1-1) a connection matrix indicating a connection state between the communication hubs in the infrastructure network, and (1-2) a delay time in a link between the communication hubs.

(2) The line information includes (2-1) a starting point and an ending point of communications in each line, (2-2) a contracted band in each line, and (2-3) a tolerance of the inter-end delay in each line. (2-1) The starting point and the ending point of the communication in each line indicates a pair of communication hubs serving as end points of the line.

(3) The apparatus information includes information on each switch and each interface, and each interface constitutes a link portion apparatus in a switch disposed at the communication hub. The information on each interface includes (3-1) a traffic capacity of each interface, and (3-2) a cost value of each interface.

(4) The design parameter information includes (4-1) the number of path candidates (an upper limit value of the number of path candidates) per line, and (4-2) the number of interface combination candidates (a design value of the number of combination candidates).

Overview of Overall Flow and Each Process

Figure 3:
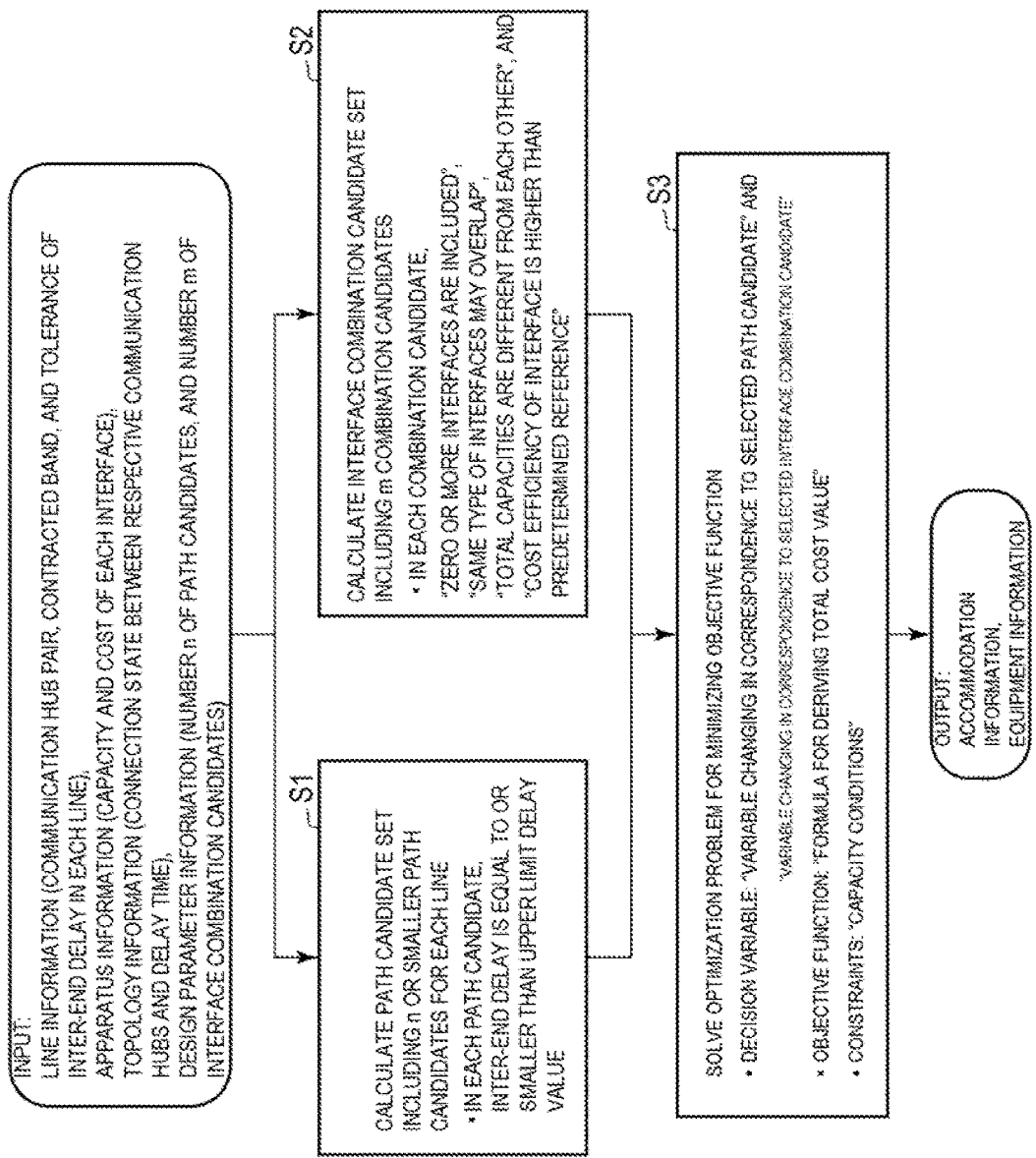
FIG. 3 is a flowchart illustrating an example of an operation procedure of the network design apparatus according to the first embodiment.

FIG. 3 is a flowchart illustrating an example of an operation procedure of the network design apparatus according to the first embodiment.

In S1, the calculation unit 12a of the first processing unit 12 calculates the path candidate set for each line. In S1, the calculation unit 12a calculates, for each line, an upper limit delay value, which is a threshold value for an inter-end delay. The calculation unit 12a calculates the path candidate set on the basis of the calculated upper limit delay value.

In S2, the calculation unit 13a of the second processing unit 13 calculates an interface combination candidate set.

S3 is performed on the basis of calculation results in S1 and S2 after S1 and S2. In S3, the calculation unit 14a of the third processing unit 14 calculates an optimal path candidate accommodating each line, and an optimal interface combination candidate to be disposed in the switch at each communication hub. The optimal network configuration is calculated on the basis of the optimal path candidates and the optimal interface combination candidates, that is, on the basis of calculation results in S3.

Details of Each Process

Next, details of S1 to S3 will be described.

Calculation of Path Candidate Set (S1)

Figure 4:
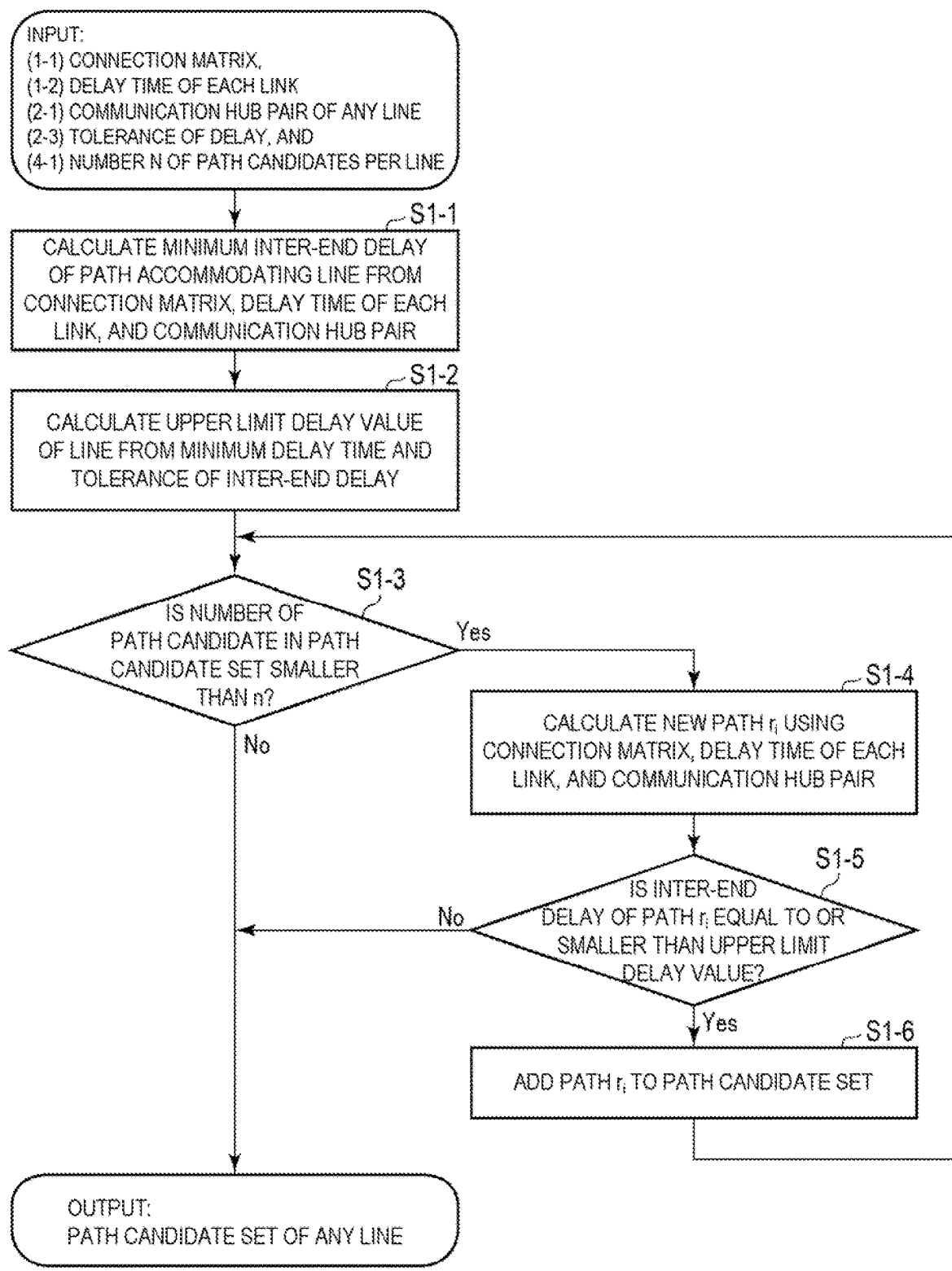
FIG. 4 is a flowchart illustrating an example of a procedure for calculating a path candidate set for any line in the first embodiment.

In the calculation of the path candidate set (S1), the calculation unit 12a of the first processing unit 12 calculates, for each line, an upper limit delay value, which is a threshold value of an inter-end delay, and the path candidate set. The upper limit delay value and the path candidate set are calculated from (1-1) the connection matrix, (1-2) the delay time of each link, (2-1) a communication hub pair, (2-3) the tolerance of the inter-end delay, and (4-1) the number of path candidates per line described above. FIG. 4 is a flowchart illustrating an example of a procedure for calculating a path candidate set for any line.

First, in S1-1, the calculation unit 12a of the first processing unit 12 calculates a minimum inter-end delay for a path accommodating any line. The minimum inter-end delay is a minimum value of the inter-end delay of the path accommodating the line. The calculation unit 12a calculates the minimum inter-end delay from (1-1) the connection matrix, (1-2) the delay time of each link, and (2-1) the communication hub pair of the line described above. For example, the calculation unit 12a creates a weighted undirected graph from (1-1) the connection matrix and (1-2) the delay time of each link. The calculation unit 12a calculates a shortest path and a sum of weights of the links in the shortest path in the created weighted undirected graph using a Dijkstra method. In this case, the sum of the weights of the links in the shortest path is calculated as the minimum inter-end delay.

Next, in S1-2, the calculation unit 12a of the first processing unit 12 calculates an upper limit delay value of the line. The calculation unit 12a calculates the upper limit delay value of the line from the minimum inter-end delay calculated in S1-1 and (2-3) the tolerance of the inter-end delay of the line. For example, when the minimum inter-end delay 1 and a numerical value i indicating the tolerance of the inter-end delay of the line have been defined, the calculation unit 12a performs calculation using 1×i as a calculation relationship for the upper limit delay value. The numerical value indicating the tolerance of the inter-end delay described above and a setting of the calculation relationship for the upper limit delay value are examples, and any value or calculation relationship can be set according to the embodiment. Accordingly, the upper limit delay value according to the tolerance of the inter-end delay can be calculated.

Next, in S1-3, the calculation unit 12a of the first processing unit 12 performs a determination using (4-1) the number n of path candidates per line. That is, the calculation unit 12a determines whether the number of path candidates already included in the path candidate set is smaller than n. When the number of path candidates already included in the path candidate set is smaller than n (S1-3: Yes), the process proceeds to S1-4. On the other hand, when the number of path candidates already included in the path candidate set is n or greater (S1-3: No), the first processing unit 12 outputs the path candidate set including the already calculated path candidates. The process of S1 ends.

In S1-4, the calculation unit 12a of the first processing unit 12 calculates a new path $r_i$. In this case, the calculation unit 12a calculates the new path $r_i$ from (1-1) the connection matrix, (1-2) the delay time of each link, and (2-1) the pair of communication hubs. Here, the calculation unit 12a calculates a new path in ascending order of inter-end delay each time the process of S1-4 is repeated. In this case, a new path is calculated, for example, using a k-shortest path algorithm (see a reference "Jin Y. Yen", Finding the K Shortest Loopless Paths in a Network", Management Science, vol. 17, No. 11, pp. 712-716, 1971"). For example, it is assumed that a weighted graph G, a starting point s, and an ending point t have been assigned. In the k-shortest path algorithm, k paths that do not include a loop from s to t are searched for in ascending order of cost. Accordingly, in S1-4, the calculation unit 12a calculates the new path in ascending order of the inter-end delay using the k-shortest path algorithm.

Then, in S1-5, the calculation unit 12a of the first processing unit 12 calculates an inter-end delay of the path $r_i$ calculated in S1-4. The calculation unit 12a determines whether the calculated inter-end delay is equal to or smaller than the upper limit delay value calculated in S1-2. When the inter-end delay of the new path $r_i$ is equal to or smaller than the upper limit delay value (S1-5: Yes), the process proceeds to S1-6. On the other hand, when the inter-end delay of the new path $r_i$ is greater than the upper limit delay value (S1-5: No), the first processing unit 12 outputs a path candidate set including the already calculated path candidates. Thus, the new path $r_i$ calculated in S1-4 is not included in the path candidate set.

Then, in S1-6, the calculation unit 12a of the first processing unit 12 adds the path $r_i$ calculated in S1-4 to the path candidate set as one path candidate.

By S1-3 to S1-6 being performed as described above, the new path $r_i$ is added to the path candidate set as the path candidate as long as the number of path candidates in the path candidate set is smaller than n and the inter-end delay of the new path $r_i$ is equal to or smaller than the upper limit delay value. Thus, in the path candidate set of any line output in S1, the number of path candidates is equal to or smaller than n, and the inter-end delay of each path candidate is equal to or smaller than the upper limit delay value of the line. Here, n is the number of path candidates per line (an upper limit value of the number of path candidates), and is input by the network designer, as described above.

In the embodiment, the path candidate set is calculated in each line using the procedure of S1 described above. The path candidate set of each line calculated in S1 is used as an input of S3.

Calculation of Interface Combination Candidate Set (S2)

Figure 5:
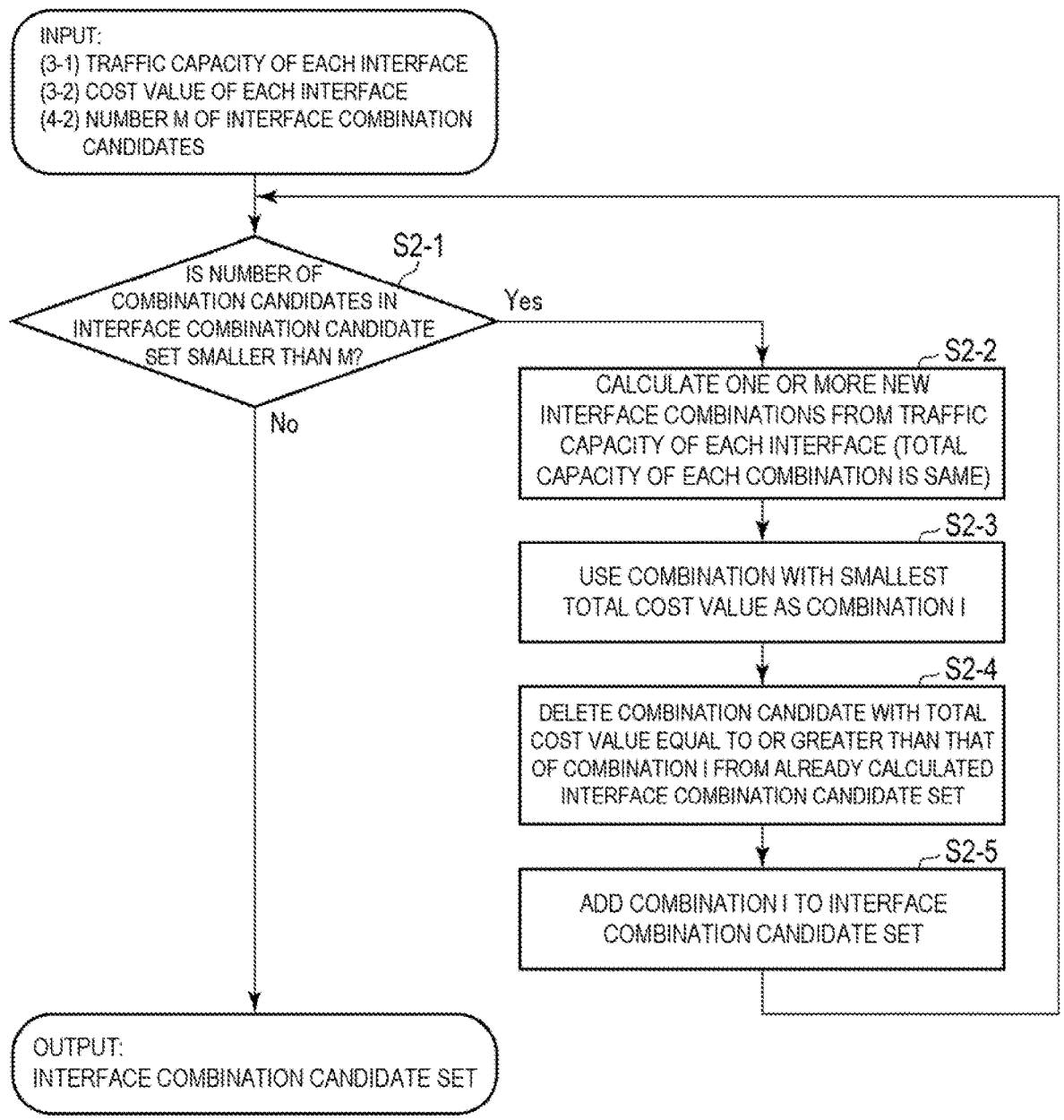
FIG. 5 is a flowchart illustrating an example of a procedure for calculating an interface combination candidate set in the first embodiment.

In the calculation of an interface combination candidate set (S2), the calculation unit 13a of the second processing unit 13 calculates the interface combination candidate set. The calculation unit 13a calculates the interface combination candidate set from (3-1) the traffic capacity of each interface, (3-2) the cost value of each interface, and (4-2) the number m of interface combination candidates. The calculated interface combination candidate set includes m combination candidates for an interface combination. Each combination candidate is a combination of zero or more interfaces, and in each combination candidate, a plurality of interfaces with the same traffic capacity may be overlapped and combined. FIG. 5 is a flowchart illustrating an example of a procedure for calculating the interface combination candidate set.

First, in S2-1, the calculation unit 13a of the second processing unit 13 performs a determination from (4-2) the number m of interface combination candidates. That is, the calculation unit 13a determines whether the number of combination candidates already included in the interface combination candidate set is smaller than m. When the number of combination candidates already included in the combination candidate set is smaller than m (S2-1: Yes), the process proceeds to S2-2. On the other hand, when the number of combination candidates already included in the combination candidate set is equal to or greater than m (S2-1: No), the second processing unit 13 outputs the interface combination candidate set including the already calculated combination candidates.

Next, in S2-2, the calculation unit 13a of the second processing unit 13 calculates one or more new interface combinations. The calculation unit 13a calculates the new combination I from (3-1) the traffic capacity of each interface. In this case, the calculation unit 13a may calculate a plurality of new combinations. In the plurality of new combinations to be calculated, however, total capacities, which are the sums of the traffic capacities of the interfaces, are the same as each other. Further, each new combination to be calculated is a combination of zero or more interfaces, and in each combination I, a plurality of interfaces of the same type are allowed to overlap. The interfaces with the same traffic capacities correspond to the same types of interfaces. Further, each time the process of S2-2 is repeated, the calculation unit 13a calculates the new combination in ascending order of the total capacity of the interfaces included in the combination.

Next, in S2-3, the calculation unit 13a of the second processing unit 13 selects one of the new combinations calculated in S2-2 using (3-2) the cost value of each interface. In this case, the calculation unit 13a selects one combination in which a total cost value that is a sum of the cost values of the interfaces is smallest, from among the combinations. The calculation unit 13a uses one selected from among the combinations as the combination I. That is, one new combination in which the total cost value of the interfaces is smallest among the new combinations calculated in S2-2 is used as the combination I.

Then, in S2-4, the calculation unit 13a of the second processing unit 13 compares the total cost value of the interfaces in the combination I with the total cost value of the interfaces in each of the combination candidates already included in the combination candidate set. The calculation unit 13a deletes the combination candidate in which the total cost value of the interfaces is equal to or greater than the total cost value of the interfaces in the combination I from among the combination candidates already included in the combination candidate set.

Here, the total capacity of the interfaces in each combination candidate already included in the combination candidate set is smaller than the total capacity of the interfaces in the combination I. Thus, in the interface combination candidate deleted from the combination candidate set in S2-4, the cost-effectiveness is lower than that in the combination I. In each combination candidate and each combination such as the combination I, the cost-effectiveness indicates a ratio of the total capacity of the interfaces to the total cost of the interfaces. For example, in a case in which the total costs of the interfaces are the same, the cost-effectiveness is lower when the total capacity of the interface is smaller. In a case in which the total capacity of the interface is the same, the cost-effectiveness is lower when the total cost of the interface is greater. In the embodiment, the interface combination candidate set can be configured using only combination candidates with the cost efficiency higher than the predetermined reference by the process of S2-4 being performed.

Then, in S2-5, the calculation unit 13a of the second processing unit 13 adds the combination I set in S2-3 to the interface combination candidate set. Thus, the process of S2-4 is performed in response to the addition of the new combination I to the combination candidate set.

By S2-1 to S2-5 being performed as described above, m combination candidates are included in the interface combination candidate set output in S2, and total capacities of the respective combination candidates are prime to each other. That is, the m combination candidates included in the interface combination candidate set differ in the total capacity of the interfaces. Further, each combination candidate is a combination of zero or more interfaces, and in each combination candidate, a plurality of interfaces of the same type are allowed to be overlap. Further, in each of the combination candidates included in the interface combination candidate set, the cost efficiency is higher than the predetermined reference. Thus, in the determination of the optimal interface combination candidate, combination candidates with low cost efficiency are excluded from an option.

Further, in S2, the combination candidates are calculated in ascending order of the total capacity of the interfaces, as described above. Further, the combination I added to the combination candidate set in S2-5 has the smallest total cost value of interfaces among one or more combinations in which the total capacity of the interfaces is the same as that of the combination I. In S2-4, the combination candidate in which the total cost value of the interfaces is equal to or greater than the total cost value of the interfaces in the combination I is deleted from among the combination candidates already included in the combination candidate set.

Thus, the m combination candidates included in the interface combination candidate set have the total cost value of the interfaces that is prime with respect to each other. That is, in the interface combination candidate set, the total cost value of the interfaces is different for each combination candidate. Further, each of the combination candidates has a larger total capacity of the interfaces than other interface combinations having the same total cost value as that of combination candidate and not included in the combination candidate set. Because the combination candidates included in the combination candidate set are selected as described above, only combination candidates with high cost efficiency are appropriately included in the combination candidate set.

In the embodiment, the interface combination candidate set is calculated using the procedure of S2 described above. The interface combination candidate set calculated in S2 is used as an input of S3.

Calculation of Optimal Network Configuration (S3)

In the calculation of the optimal network configuration (S3), the calculation unit 14a of the third processing unit 14 solves the optimization problem for minimizing the objective function, as in S'3 of NPL 1. That is, the calculation unit 14a uses a variable indicating which path candidate has been selected from the path candidate set as a decision variable. The decision variable indicating the selected path candidate is set for each line. Further, the calculation unit 14a uses a variable indicating which combination candidate has been selected from the interface combination candidate set, as a decision variable. The decision variable indicating the selected combination candidate is set for each link. Further, the calculation unit 14a uses a relationship deriving a total cost of all the interfaces in the infrastructure network as an objective function. The total cost of all the interfaces changes in correspondence to which combination candidate has been selected from the interface combination candidate set.

In the optimization problem of S3, constraints for selecting one path candidate in each line are provided, and the constraints are shown in the relationship (2), as in S'3 described above. The variable x is provided as a decision variable of the optimization problem, and the variable x indicates, for each line, the path candidate selected as a path to be accommodated from the path candidate set. Further, in the optimization problem, constraints for selecting one interface combination candidate are provided for each link, as in S'3 described above, and the constraints are shown in the relationship (3). The variable y is provided as the decision variable of the optimization problem, and the variable y indicates the combination candidate selected as a combination of interfaces to be disposed from the combination candidate set, for each link (for each link portion).

Further, in the optimization problem, the capacity conditions of the relationship (4) are provided as in S'3 described above. That is, in each link (each link portion), a capacity condition is that the total contracted band $t^e$ is equal to or smaller than the total capacity $\Psi_j^{IF}$ of all the interfaces constituting the selected combination candidate. Thus, in the optimization problem, the combination candidate j selected from the interface combination candidate set needs to satisfy the capacity conditions described above in each link.

Here, the total contracted band $t^e$ of each link is calculated on the basis of the path candidate selected for each line, the contracted band of each line, and the connection matrix indicating the connection state between the communication hubs. Here, the path candidate selected for each line is indicated by the variable x, which is the decision variable, in the relationships (1) to (4) described above. Further, the contracted band of each line is included in the input information described above, and corresponds to a parameter d, which is one of the parameters relevant to the relationships (1) to (4) described above. The connection matrix is included in the input information described above, and corresponds to a parameter M, which is one of the parameters relevant to the relationships (1) to (4). Thus, when the path candidate for each line is selected, the total contracted band $t^e$ of each link is calculated from the line information and the topology information.

Further, in the optimization problem of S3, the total cost value of all the interfaces on the infrastructure network shown in the relationship (1) is used as an objective function, and an optimization problem for minimizing the objective function is solved, as in S'3 described above. In the relationship (1), $y_j^e \cdot \Omega_j^{IF}$ indicates the total cost value of the interfaces in the selected combination candidate j for the link e. A sum of the total cost values calculated for each link, that is, a sum of the cost values of all the interfaces becomes the objective function. In the calculation of the total cost value of the total interface that is the objective function, the total cost value of the selected interface combination candidates for each link is calculated. The total cost values of all the links are summed, and a value obtained by doubling the sum is used as a value of the objective function. Doubling the sum is because the selected interface combination candidate is connected to both ends of each link.

The path candidate for each line and the interface combination candidate for each link for minimizing the objective function, which is the total cost value of all the interfaces, are derived by solving the optimization problem. That is, an optimal decision variable x is derived for each line, and an optimal decision variable y is derived for each link (each link portion). The derived path candidate for each line is the optimal path candidate for each line, and the derived interface combination candidate for each link is the optimal interface combination candidate for each link.

As described above, the calculation unit 14a of the third processing unit 14 calculates the optimal path candidates for each line and the optimal interface combination candidates for each link portion at each communication hub by solving the optimization problem. The third processing unit 14 outputs the calculated optimal path candidate and the calculated optimal interface combination candidates to the output unit 15.

In the embodiment, only interface combination candidates with a cost efficiency higher than the predetermined reference are included in the interface combination candidate set. Thus, in the calculation of the optimization problem of S3, it is possible to efficiently derive the optimal path candidate and the optimal interface combination candidate without taking the pattern of the network configuration with low cost efficiency into account.

Operational Example

An operation example in the first embodiment divided into an example of input information and an operation example of each process will be described.

Example of Input Information

Topology Information

Figure 6:
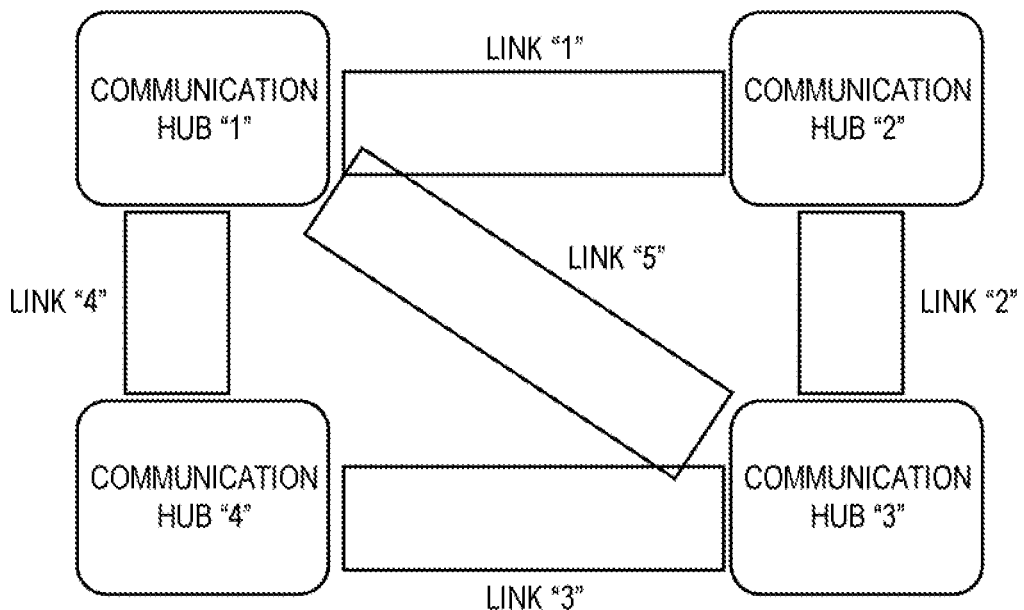
FIG. 6 is a schematic diagram illustrating an example of a topology in an operation example of the first embodiment.
Figure 7:
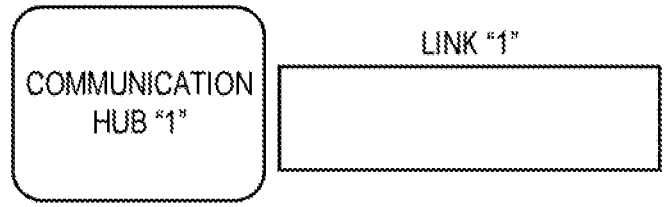
FIG. 7 is a schematic diagram illustrating a model example for use in the example of the topology of FIG. 6.

FIG. 6 is a diagram illustrating an example of the topology. FIG. 7 is a diagram illustrating a model example for use in the example of the topology in FIG. 6. That is, FIG. 7 is a diagram illustrating, for example, symbols used in the example in FIG. 6. In FIG. 7, communication hub "1" indicates a communication hub with the communication hub number of 1. Further, in FIG. 7, link "1" indicates a link with a link number of 1 and is connected to communication hub "1".

FIG. 6 illustrates a connection state between communication hubs. Specifically, a connection state of communication hubs corresponding to communication hubs "1" to "4" via link "1" to link "5" is shown. The connection matrix M indicating the connection state between the communication hubs in the example of FIG. 6 is shown in the relationship (A) below.

[Math. 3]

$$M = \begin{pmatrix} 1 & 0 & 0 & 1 & 1 \\ 1 & 1 & 0 & 0 & 0 \\ 0 & 1 & 1 & 0 & 1 \\ 0 & 0 & 1 & 1 & 0 \end{pmatrix} \tag{A}$$

In the connection matrix M, each row corresponds to a communication hub, and each column corresponds to a link.

When the link is connected to the communication hub, "1" is stored in a corresponding portion of the connection matrix M. On the other hand, when the link is not connected to the communication hub, "0" is stored in the corresponding portion of the connection matrix M.

Further, an example of the delay time in each link is shown as the topology information in Table 1 below. In Table 1, a delay time between the communication hubs is shown.

TABLE 1

| Link No. | Delay time |
|---|---|
| 1 | 2 |
| 2 | 1 |
| 3 | 2 |
| 4 | 1 |
| 5 | 4 |

Line Information

Next, an example of information on the line accommodated in the network is shown in Table 2 below.

TABLE 2

| Line No. | Communication hub pair | Contracted band | Tolerance of inter-end delay |
|---|---|---|---|
| 1 | 1, 3 | 10 | 1 |
| 2 | 1, 3 | 10 | 1 |
| 3 | 1, 3 | 10 | 0 |
| 4 | 1, 3 | 10 | 0 |

In an example of Table 2, in line "1" with the line number of "1", communication of a contracted band "10" is performed between communication hub "1" and communication hub "3". Line "1" has the tolerance of the inter-end delay of "0". Here, in the example of Table 2, the tolerance of the inter-end delay is set to a value of 0 or 1. In this example, when the tolerance of the inter-end delay is 1, the tolerance is determined to be high, and a delay time twice the inter-end delay of the shortest path is set as the upper limit delay value. On the other hand, when the tolerance is 0, the tolerance is determined to be low, and the inter-end delay of the shortest path is set as the upper limit delay value.

Apparatus Information

Next, an example of information on a switch that is a transfer apparatus (network apparatus) disposed at the communication hub and an interface (link portion apparatus) installed in the link portion of the switch will be described.

Figure 8:
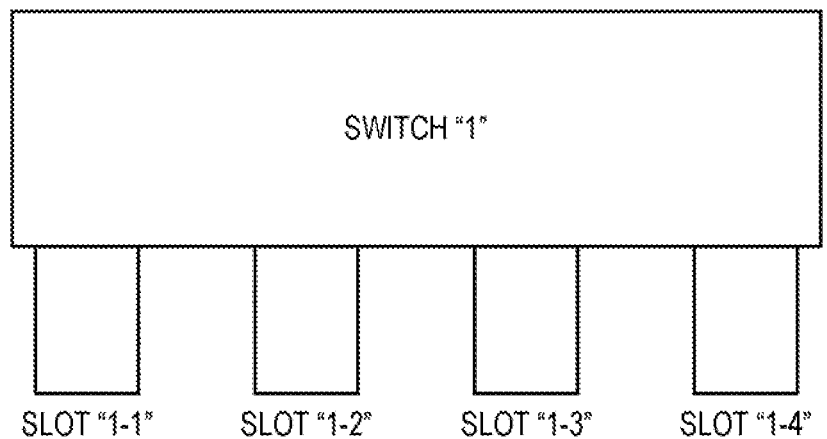
FIG. 8 is a schematic diagram illustrating an example of a switch in the operation example in the first embodiment.

FIG. 8 illustrates an example of the switch. The switch in the example of FIG. 8 is a switch "1" with a switch number "1" and includes a slot "1-1", a slot "1-2", a slot "1-3", and a slot "1-4". The switch "1" receives data in which a destination is indicated. The switch "1" determines a slot to output the data on the basis of the destination indicated in the data. Thereby, a link that outputs data is determined The slot corresponds to a connection portion (link connection portion) between a communication hub and the link. Further, the slot accommodates an interface.

Figure 9:
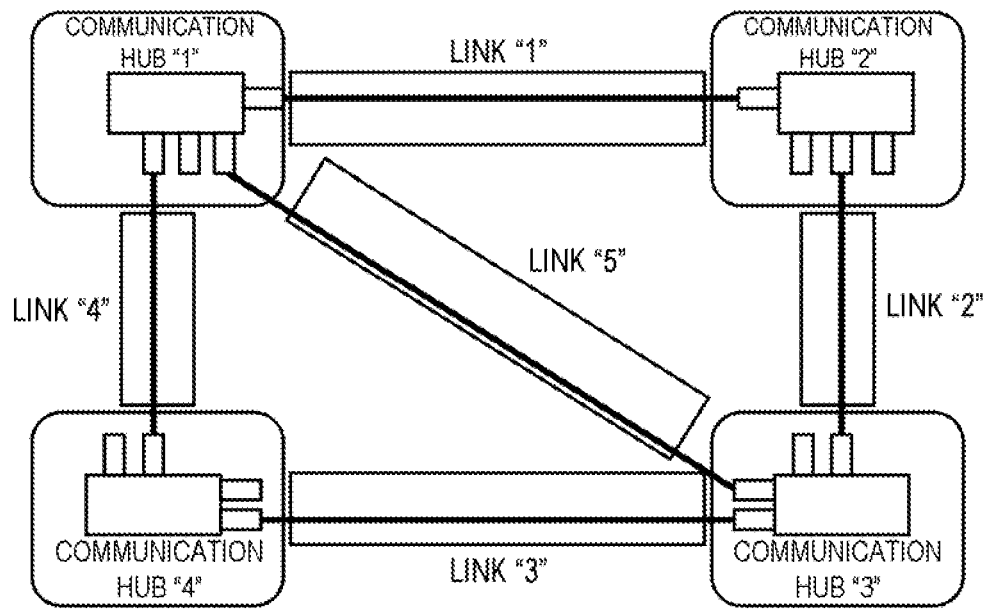
FIG. 9 is a schematic diagram illustrating an example of disposition of switches in an infrastructure network illustrated in FIG. 6.

FIG. 9 illustrates an example of disposition of switches in the infrastructure network illustrated in FIG. 6. Thus, in FIG. 9, an example of a method of connecting switches in the topology of FIG. 6 is shown. In an example of FIG. 9, a switch is installed in communication hubs "1" to "4". The slots of each switch are connected by a cable via a link, and the respective communication hubs are connected.

Next, an example of information on the switch is shown in Table 3 below.

TABLE 3

| Transfer apparatus | Number of slots | Traffic capacity per slot |
|---|---|---|
| Switch "1" | 4 | 100 Gbit/s |
| Switch "2" | 8 | 100 Gbit/s |
| Switch "3" | 16 | 100 Gbit/s |

In an example of Table 3, information on switches with switch numbers of "1" to "3" is shown. In the example of Table 3, switch "1" with the switch number of "1" includes four slots. Further, in switch "1", a total amount of traffic capacity that can be processed is 400 Gbit/s because a traffic capacity per slot is 100 Gbit/s. The total amount of traffic capacity is a sum of the traffic capacities of the slots provided in the switch.

Further, an example of information on the interface is shown in Table 4 below.

TABLE 4

| Link portion apparatus | Traffic Capacity | Cost value | Capacity |
|---|---|---|---|
| Interface "1" | 10 Gbit/s | 1 | 1 per slot |
| Interface "2" | 40 Gbit/s | 3 | 1 per slot |
| Interface "3" | 100 Gbit/s | 5 | 1 per slot |

In the example of Table 4, information on interfaces with interface numbers of "1" to "3" is shown. In the example of Table 4, in interface "1" with the interface number of "1", a traffic capacity that can be processed is 10 Gbit/s. One interface "1" can be installed in one slot and has a cost value of 1.

Design Parameter Information

An example of the design parameter information is shown in Table 5 below. In the example of Table 5, the design parameter information includes the number of path candidates per line (an upper limit value of the number of path candidates), and the number of interface combination candidates (a design value of the number of interface combination candidates).

TABLE 5

| Number of path candidates per line | 3 |
|---|---|
| Number of interface combination candidates | 10 |

Example of Operation of Each Process

Calculation of Path Candidate Set (S1)

First, in S1-1, a minimum inter-end delay of each line is calculated. Table 6 below shows an example of a minimum inter-end delay of each line. In Table 6, for example, a minimum inter-end delay when the input information described above in the operation example has been input is shown.

TABLE 6

| Line No. | Communication hub pair | Minimum inter-end delay |
|---|---|---|
| 1 | 1, 3 | 3 |
| 2 | 1, 3 | 3 |
| 3 | 1, 3 | 3 |
| 4 | 1, 3 | 3 |

In an example of Table 6, in a communication hub pair of communication hub "1" and communication hub "3", the inter-end delay has a minimum value in a path passing through link "1", communication hub "2", and link "2" and a path passing through link "4", communication hub "4", and link "3". Thus, the inter-end delay in the path passing through link "1", communication hub "2", and link "2" or the inter-end delay in the path passing through link "4", communication hub "4", and link "3" is set as the minimum inter-end delay. From Table 1 described above, the delay time of link "1" is 2, and the delay time of link "2" is 1. Thus, the inter-end delay in the path passing through link "1", communication hub "2", and link "2" becomes "2+1=3".

Next, in S1-2, the upper limit delay value of each line is calculated. Table 7 below shows an example of the upper limit delay value of each line. In Table 7, for example, the upper limit delay value when the input information described above in the operation example is input and the minimum inter-end delay is calculated as in Table 6 of the operation example is shown.

TABLE 7

| Line No. | Communication hub pair | Tolerance of inter-end delay | Minimum inter-end delay | Upper limit delay value |
|---|---|---|---|---|
| 1 | 1, 3 | 1 | 3 | 6 |
| 2 | 1, 3 | 1 | 3 | 6 |
| 3 | 1, 3 | 0 | 3 | 3 |
| 4 | 1, 3 | 0 | 3 | 3 |

In an example of Table 7, line "1" and line "2" with the tolerance of the inter-end delay of 1 are determined to be high in the tolerance. Thus, in line "1" and line "2", a delay time twice the minimum inter-end delay is set as the upper limit delay value, and the upper limit delay value is 6. On the other hand, line "3" and line "4" with the tolerance of the inter-end delay of 0 are determined to be low in the tolerance. Thus, in line "3" and line "4", the minimum inter-end delay is set as the upper limit delay value, and the upper limit delay value is 3.

Next, the path candidates in each line are calculated in S1-3 to S1-6. When the input information shown in one example of the input information has been input, the path candidates are calculated on the basis of the number of path candidates of 3 per line set in Table 5. Thus, in each line, a maximum of three path candidates are calculated. Table 8 below shows an example of path candidates of each line to be calculated, and shows an example of the path candidate set. In Table 8, for example, the path candidate set when the input information described above is input in the operation example and the upper limit delay value is calculated as in Table 7 of the operation example is shown.

TABLE 8

| Line No. | Upper limit delay value | Path candidate | Used link |
|---|---|---|---|
| 1 | 6 | 1-1 | Link "1", link "2" |
|   |   | 1-2 | Link "3", link "4" |
|   |   | 1-3 | Link "5" |
| 2 | 6 | 2-1 | Link "1", link "2" |
|   |   | 2-2 | Link "3", link "4" |
|   |   | 2-3 | Link "5" |
| 3 | 3 | 3-1 | Link "1", link "2" |
|   |   | 3-2 | Link "3", link "4" |
|   |   | 3-3 | — |

TABLE 8-continued

| Line No. | Upper limit delay value | Path candidate | Used link |
|---|---|---|---|
| 4 | 3 | 4-1 | Link "1", link "2" |
|   |   | 4-2 | Link "3", link "4" |
|   |   | 4-3 | — |

In the example of Table 8, line "1" has the upper limit delay value of "6". Thus, in line "1", path "1-1" and "1-2" with the inter-end delay of "3", and path "1-3" with the inter-end delay of "4" are used as path candidates. On the other hand, line "3" has the upper limit delay value of "3". Thus, in line "3", only paths "3-1" and "3-2" with the inter-end delay of "3" are path candidates.

Calculation of Interface Combination Candidate Set (S2)

Table 9 below shows an example of an interface combination candidate set to be calculated. In Table 9, for example, the interface combination candidate set when the input information described above in the operation example has been input is shown.

TABLE 9

| Candidate No. of interface combination candidate | Combination | Total capacity | Total cost value |
|---|---|---|---|
| 1 | — | 0 | 0 |
| 2 | Interface "1" | 10 | 1 |
| 3 | Interface "1" *2 | 20 | 2 |
| 4 | Interface "2" | 40 | 3 |
| 5 | Interface "2", interface "1" *1 | 50 | 4 |
| 6 | Interface "2", interface "1" *2 | 60 | 5 |
| 7 | Interface "2" *2 | 80 | 6 |
| 8 | Interface "2" *2, interface "1" *1 | 90 | 7 |
| 9 | Interface "2" *2, interface "1" *2 | 100 | 8 |
| 10 | Interface "2" *3 | 120 | 9 |

In the calculation of the interface combination candidate set, one or more new combinations of interfaces are calculated each time S2-2 is repeated. In S2-2, a total capacity of interfaces included in the new combination to be calculated is different each time, and a new combination is calculated in ascending order of the total capacity each time the process of S2-2 is repeated. Thus, in S2-2, the interfaces included in the new combination to be calculated form different combinations each time.

For example, a case in which a combination of interfaces with a total capacity of "30 Gbit/s" is calculated in S2-2 will be described. In this case, a combination including three interfaces with a capacity of "10 Gbit/s" is calculated as the combination of interfaces with a total capacity of "30 Gbit/s". The number of combinations of interfaces with a total capacity of "30 Gbit/s" is only one Thus, in S2-3, a combination including three interfaces with a capacity of "10 Gbit/s" is set as the combination I. Further, the total cost value of a combination including three interfaces with a capacity of "10 Gbit/s" is "1*3=3".

In S2-4, the total cost value of the interfaces in the combination I is compared with the total cost value of the interfaces in each of the combination candidates already included in the combination candidate set. Here, in a stage in which the combination with the total capacity of "30 Gbit/s" in which three interfaces with a capacity of "10 Gbit/s" are included is set as the combination I, three combination candidates to be described below are included in the interface combination candidate set. That is, a combination candidate "ja" with a total capacity of "0 Gbit/s" including no interfaces, a combination candidate "jb" with a total capacity of "10 Gbit/s" including one interface with a capacity of "10 Gbit/s", and a combination candidate "jc" with a total capacity of "10 Gbit/s" including two interfaces with a capacity of "10 Gbit/s" are already included in the combination candidate set.

The total cost value of the interfaces included in the combination candidate is "0" in the combination candidate "ja", "1*1=1" in the combination candidate "jb", and "1*2=2" in the combination candidate "jc". Thus, a total cost value of each of the interface combination candidates "j a" to "jc" already included in the combination candidate set is smaller than the total cost value of the combination I. Thus, none of the combination candidates is deleted from the combination candidate set. In S2-5, the combination I with the total capacity of "30 Gbit/s" including three interfaces with a capacity of "10 Gbit/s" is added as the combination candidate "jd" to the interface combination candidate set.

When the input information described above has been input in the operation example, the process of S2-1 is performed on the basis of the number 10 of interface combination candidates set in Table 5. That is, in S2-1, it is determined whether the number of calculated combination candidates is smaller than 10. In a stage in which the combination candidate "jd" has been added to the combination candidate set, the number of the interface combination candidates included in the combination candidate set is four, including the combination candidates "ja" to "jd", and is smaller than 10. The process proceeds to S2-2.

In S2-2, combinations of interfaces with a total capacity of "40 Gbit/s" are calculated. In this case, a combination including four interfaces with a capacity of "10 Gbit/s" and a combination including one interface with a capacity of "40 Gbit/s" are calculated as the combinations of the interfaces with the total capacity of "40 Gbit/s".

In S2-3, the total cost value of the combination calculated in S2-2 is calculated. Here, the total cost value of the combination in which four interfaces with a capacity of "10 Gbit/s" are included is "1*4=4", and the total cost value of the combination in which one interface with a capacity of "40 Gbit/s" is included is "3*1=3". That is, the combination in which one interface with a capacity of "40 Gbit/s" is included among the combinations calculated in S2-2 has the smallest total cost value. Thus, in S2-3, a combination including one interface with a capacity of "40 Gbit/s" is set as a combination I.

In S2-4, the total cost value of the interfaces in the combination I is compared with the total cost value of the interfaces in each of the combination candidates already included in the combination candidate set. Here, in a stage in which the combination with the total capacity of "40 Gbit/s" in which one interface with a capacity of "40 Gbit/s" is included is set as the combination I, the combination candidates "ja" to "jd" of the four interfaces described above are included in the combination candidate set.

Among the interface combination candidates "ja" to "jd" already included in the combination candidate set, the total cost value of each of the combination candidates "j a" to "jc" is smaller than the total cost value of the combination I. However, the total cost value of the combination candidate "jd" is the same as the total cost value of the combination I, and becomes equal to or greater than the total cost value of the combination I. Thus, the combination candidate "jd" with the total capacity of "30 Gbit/s" including three interfaces with "10 Gbit/s" is deleted from the combination candidate set. In S2-5, the combination I with the total capacity of "40 Gbit/s" including one interface with a capacity of "40 Gbit/s" is added as the combination candidate "je" to the interface combination candidate set.

The process of S2-1 is performed on the basis of the number of interface combination candidates set in Table 5 of 10. Thereby, the processes of S2-2 to S2-5 are repeatedly performed until the number of combination candidates included in the interface combination candidate set becomes 10. Thus, for the interface combination, the total capacities are different from each other, and ten combination candidates with different total cost values are calculated. Further, candidate numbers "1" to "10" are set for the combination candidates. In the operation example, when the candidate number is greater, the total capacity of the interfaces included in the combination candidate is greater. Thus, when the candidate number is greater, the total cost value of the interfaces included in the combination candidate is greater.

Calculation of Optimal Network Configuration (S3)

In S3, the optimization problem described above is solved. Table 10 shows an example of the optimal path candidates of each line calculated in the optimization problem. Further, Table 11 shows an example of an optimal interface combination candidate of each link calculated in the optimization problem. For example, when S1 and S2 have been performed as described above in the operation example, the optimal path candidates of each line are calculated as in Table 10, and the optimal interface combination candidates of each link are calculated as in Table 11.

TABLE 10

| Line No. | No. of selected path candidate |
|---|---|
| 1 | 1-1 |
| 2 | 2-1 |
| 3 | 3-1 |
| 4 | 4-1 |

TABLE 11

| Link No. | Total contracted band $t^e$ | Candidate No. of interface combination candidate |
|---|---|---|
| 1 | 40 | 5 |
| 2 | 40 | 5 |
| 3 | 0 | 1 |
| 4 | 0 | 1 |
| 5 | 0 | 1 |

That is, when S1 and S2 have been performed as described above in the operation example, the following path is calculated as the optimal path candidate for each line. Path "1-1" for line "1". Path "2-1" for line "2". Path "3-1" for line "3". Path "4-1" for line "4". An interface combination candidate with the candidate number of "5" is calculated as the optimal combination candidate for each of links "1" and "2", and an interface combination candidate with the candidate number of "1" is calculated as the optimal combination candidate for each of links "3" to "5".

Further, in S3, the capacity conditions described above need to be satisfied for each link. That is, in each link (each link portion), it is necessary for the total contracted band $t^e$ to be equal to or smaller than the total capacity $\Psi_j^{IF}$ of all the interfaces constituting the selected combination candidates. In the operation example, the optimal path candidates of each line and the optimal combination candidates of each link are calculated as described above. Thus, for example, in link "1", the total contracted band $t^1$ is "10+10+10+10=40 Gbit/s". For link "1", the combination candidate with the candidate number of "5" in which a total capacity $\Psi_5^{IF}$ of the interface is 40 Gbit/s is calculated as the optimal interface combination candidate. Thus, in link "1", the capacity conditions described above are satisfied.

Further, in link "3", the total contracted band $t^3$ is "0+0+0+0=0 Gbit/s". For link "3", the combination candidate with the candidate number of "1" in which the total capacity $\Psi_1^{IF}$ of the interface is 0 Gbit/s is calculated as the optimal interface combination candidate. Thus, in link "3", the capacity conditions described above are satisfied.

Further, when the optimal path candidate of each line has been calculated as in Table 10 and the optimal interface combination candidate of each link has been calculated as in Table 11, a sum of the cost values of the interfaces for all the links is as follows. That is, the total cost value of all the interfaces of the network, which is the objective function, is "2*(3+3+0+0+0)=12", which is a minimum value.

Figure 10:
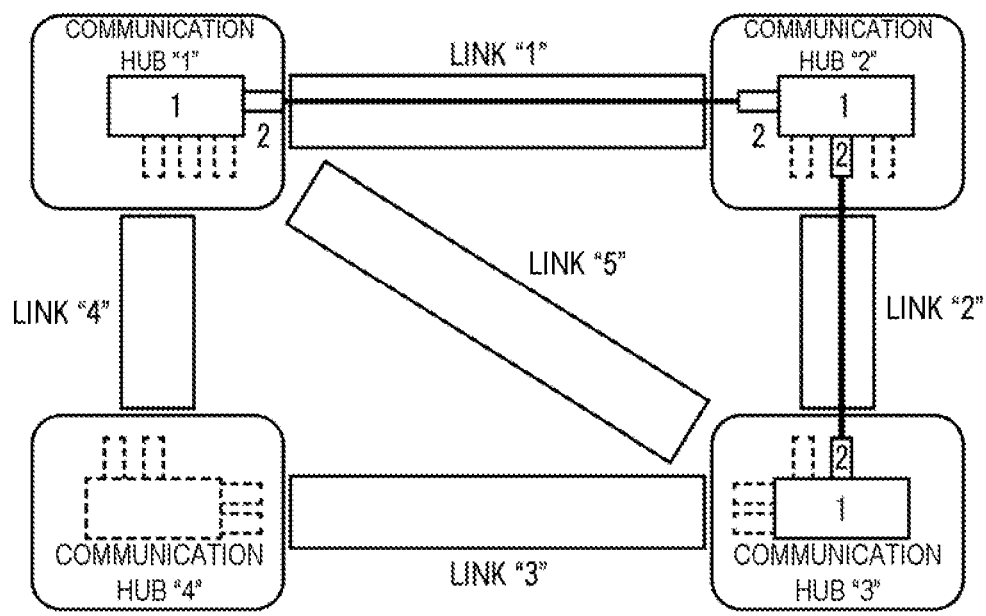
FIG. 10 is a schematic diagram illustrating an example of an optimal disposition example in a network in the operation example in the first embodiment.

An optimal network configuration, that is, an optimal disposition example in the network is generated and output on the basis of the optimal path candidate of each line and the optimal interface combination candidate of each link derived as described above. FIG. 10 illustrates an example of an optimal disposition in a network. FIG. 10 illustrates a disposition example when the optimal path candidates of each line have been calculated as in Table 10, the optimal interface combination candidates of each link have been calculated as in Table 11.

In the optimal disposition example illustrated in FIG. 10, the transfer apparatuses are disposed only at the communication hubs "1" to "3", and the transfer apparatus is not disposed at the communication hub "4". At each of communication hubs "1" to "3", one interface of a type of interface "2" with the traffic capacity of 40 Gbit/s is installed only in the link portions of links "1" and "2". The interface is not installed in the link portions of links "3" to "5".

Operations and Effects

In the embodiment, in S2, an interface combination candidate set serving as an option of an optimal solution is configured using only combination candidates with a cost-effectiveness higher than the predetermined reference, prior to the optimization calculation of S3. Thereby, in the combination candidate set, the combination candidates that are cost-effective and less likely to be derived as an optimal solution of the optimization calculation are excluded. Thus, an optimal solution can be more efficiently searched for in the optimization calculation.

Here, a case in which an interface combination candidate set is calculated similarly to S'2 in NPL 1 is considered as a comparative example. Table 12 shows an example of an interface combination candidate set calculated in the comparative example. In the comparative example, it is assumed that the same input information as in the operation example described above is input, and the input information shown in Table 1 to Table 5, for example, is input.

TABLE 12

| Candidate No. of interface combination candidate | Combination | Total capacity | Total cost value |
|---|---|---|---|
| 1 | — | 0 | 0 |
| 2 | Interface "1" | 10 | 1 |
| 3 | Interface "1" *2 | 20 | 2 |
| 4 | Interface "1" *3 | 30 | 3 |
| 5 | Interface "2" | 40 | 3 |

TABLE 12-continued

| Candidate No. of interface combination candidate | Combination | Total capacity | Total cost value |
|---|---|---|---|
| 6 | Interface "2", interface "1" *1 | 50 | 4 |
| 7 | Interface "2", interface "1" *2 | 60 | 5 |
| 8 | Interface "2", interface "1" *3 | 70 | 6 |
| 9 | Interface "2" *2 | 80 | 6 |
| 10 | Interface "2" *2, interface "1" *1 | 90 | 7 |

The interface combination candidate set shown in Table 9 calculated in the operation example described above is compared with the interface combination candidate set shown in Table 12 calculated in the comparative example. For example, the two combination candidates with candidate numbers of "4" and "5" are included as combination candidates with the total cost value of "3" in the combination candidate set of the comparative example. However, the combination candidate with the candidate number of "5" has the larger total capacity of the interfaces and a higher cost-effectiveness than the combination candidate with the candidate number of "4". Thus, the combination candidate with the candidate number of "4" having a low cost-effectiveness and less likely to be derived as an optimal solution is included in the combination candidate set of the comparative example.

On the other hand, only one combination candidate with the candidate number of "4" is included as the combination candidate with the total cost value of "3" in the combination candidate set of the operation example described above. Here, a combination candidate with the candidate number of "4" in the operation example is the same as a combination candidate with the candidate number of "5" in the comparative example. A combination corresponding to a combination candidate with the candidate number of "4" in the comparative example is excluded from the combination candidate set in the operation example. Thus, a combination of interfaces that are cost-effective and less likely to be derived as the optimal solution is excluded from the combination candidate set in the operation example.

In the embodiment, because the combination candidate set is configured with combinations having a low cost-effectiveness excluded as described above, the total cost values of the respective combination candidates are different from each other in the interface combination candidate set. In the optimization calculation of S3, because the total cost value of all the interfaces in the network is the objective function, the combination candidate with a small total cost value is selected as an interface combination candidate in each link. Further, in a real network, it is preferable for equipment with a larger capacity to be disposed when pieces of equipment have the same cost value.

With the process described above in the embodiment, it becomes easy for the interface combination candidate having a smaller total cost value and a larger capacity to be selected as an optimal solution in the optimization calculation. Thus, it is possible to efficiently derive a network configuration suitable for an actual network.

A scheme described in each embodiment is stored in a recording medium such as a magnetic disk (a Floppy (registered trademark) disk, a hard disk, or the like), an optical disc (a CD-ROM, a DVD, an MO, or the like), a semiconductor memory (a ROM, a RAM, a flash memory, or the like) or transferred by a communication medium for distribution, as a program (a software means) that can be executed by a calculator (a computer). The program stored in the medium also includes a setting program for causing a software means (including not only an execution program but also a table or data structure), which will be executed in a calculator, to be configured within the calculator. A calculator implementing the present apparatus executes the above-described process by loading the program recorded on the recording medium or constructing a software means using the setting program in some cases, and controlling an operation using the software means. The recording medium referred to herein is not limited to a recording medium for distribution, and includes a storage medium such as a magnetic disk or a semiconductor memory provided inside the calculator or in a device connected via a network.

The present invention is not limited to the embodiments, and it is possible to make various modifications without departing from the gist of the present invention. Further, the embodiments may be implemented in appropriate combination as much as possible, and in this case, effects of the combination can be obtained. Further, inventions in various stages are included in the above embodiment and various inventions can be extracted by an appropriate combination in a plurality of configuration requirements that are disclosed.

REFERENCE SIGNS LIST

10: Network design apparatus
11: Input unit
12: First processing unit
13: Second processing unit
14: Third processing unit
12a, 13a, 14a: Calculation unit
15: Output unit

The invention claimed is:

1. A network design apparatus for designing a network configuration for a network in which a router is disposed at each of a plurality of communication hubs and the communication hubs are connected via lines by interfaces of a plurality of routers, the network design apparatus comprising:
  a processor; and
  a storage medium having computer program instructions stored thereon, the computer program instructions when executed by the processor:
    receive an input of topology information on a connection state between the communication hubs, line information regarding a plurality of lines accommodated in the network, apparatus information regarding the router disposed at the communication hub and the interfaces in the router, and design parameter information regarding parameters used in the design;
    calculate first path candidate sets of the lines on the basis of the topology information, the line information, and the design parameter information;
    calculate second candidate sets of the interfaces on the basis of the apparatus information and the design parameter information, wherein calculating comprises adding a new combination of interfaces to the second candidate sets as a candidate in ascending order of the total capacity of the interface, and deleting in response to adding the new combination to the second candidate sets a candidate in which a total cost value of the interface is equal or greater than a total cost value of the interface in the added new combination, from among the candidates already included in the second candidate sets of the interfaces,
    configure the second candidate sets of the interfaces using only candidates of the interfaces with a cost-effectiveness indicating a ratio of a total capacity of an interface to a first total cost value of the interface in terms of capacity that is higher than a predetermined reference, wherein both a total capacity of the interface and a first total cost value of the interface are different for each candidate in the second candidate sets of the interfaces, or each of the candidates in the second candidate sets of the interfaces has a larger total capacity of the interface than other combinations of interfaces having the same first total cost value of the candidates and not included in the second candidate sets;
    calculate an optimal candidate of each of the lines and an optimal candidate of the interfaces for minimizing a second-total cost value of the overall network on the basis of the first and second candidate sets; and
    generate network configuration information reflecting both the optimal first candidate of the lines and the optimal second candidate of the interfaces.

2. A non-transitory computer readable medium including a network design processing program for designing a network configuration for a network in which a router is disposed at each of a plurality of communication hubs and the communication hubs are connected via lines by interfaces of a plurality of routers, the network design processing program, when executed, causing a processor to:
  Acquire topology information on a connection state between the communication hubs, line information regarding a plurality of lines accommodated in the network, apparatus information regarding the router disposed at the communication hub and the interfaces in the router, and design parameter information regarding parameters used in the design;
  calculate first path candidate sets of the lines on the basis of the topology information, the line information, and the design parameter information;
  calculate second candidate sets of the interfaces on the basis of the apparatus information and the design parameter information, wherein calculating comprises adding a new combination of interfaces to the second candidate sets as a candidate in ascending order of the total capacity of the interface, and deleting in response to adding the new combination to the second candidate sets a candidate in which a total cost value of the interface is equal or greater than a total cost value of the interface in the added new combination, from among the candidates already included in the second candidate sets of the interfaces,
  configure the second candidate sets of the interfaces using only candidates of the interfaces with a cost-effectiveness indicating a ratio of a total capacity of an interface to a first total cost value of the interface in terms of capacity that is higher than a predetermined reference, wherein both a total capacity of the interface and a first total cost value of the interface are different for each candidate in the second candidate sets of the interfaces, or each of the candidates in the second candidate sets of the interfaces has a larger total capacity of the interface than other combinations of interfaces having the same first total cost value of the candidates and not included in the second candidate sets;

calculate an optimal candidate of each of the lines and an optimal candidate of the interfaces for minimizing a second-total cost value of the overall network on the basis of the first and second candidate sets; and output network configuration information reflecting both the optimal first candidate of the lines and the optimal second candidate of the interfaces.

3. A network design method for designing a network configuration for a network in which a router is disposed at each of a plurality of communication hubs and the communication hubs are connected via lines by interfaces of a plurality of routers, the network design method comprising:

acquiring topology information on a connection state between the communication hubs, line information regarding a plurality of lines accommodated in the network, apparatus information regarding the router disposed at the communication hub and the interfaces in the router, and design parameter information regarding parameters used in the design;

calculating first path candidate sets of the lines on the basis of the topology information, the line information, and the design parameter information;

calculating second candidate sets of the interfaces on the basis of the apparatus information and the design parameter information, wherein calculating comprises adding a new combination of interfaces to the second candidate sets as a candidate in ascending order of the total capacity of the interface, and deleting in response to adding the new combination to the second candidate sets a candidate in which a total cost value of the interface is equal or greater than a total cost value of the interface in the added new combination, from among the candidates already included in the second candidate sets of the interfaces, configuring the second candidate sets of the interfaces using only candidates of the interfaces with a cost-effectiveness indicating a ratio of a total capacity of an interface to a first total cost value of the interface in terms of capacity that is higher than a predetermined reference, wherein both a total capacity of the interface and a first total cost value of the interface are different for candidates in the second candidate sets of the interfaces, or each of the candidates in the second candidate sets of the interfaces has a larger total capacity of the interface than other combinations of interfaces having the same first total cost value of the candidates and not included in the second candidate sets;

calculating an optimal candidate of each of the lines and an optimal candidate of the interfaces for minimizing a second total cost value of the overall network on the basis of the first and second candidate sets; and outputting network configuration information reflecting both the optimal first candidate of the lines and the optimal second candidate of the interfaces.

* * * * *